United States Patent
Youcheff et al.

(10) Patent No.: US 6,265,007 B1
(45) Date of Patent: Jul. 24, 2001

(54) ANHYDROUS MILK FAT/VEGETABLE FAT FOOD INGREDIENT

(75) Inventors: Gary G. Youcheff, Maytown, PA (US); Alfred P. Hensler, Belvidere, NJ (US)

(73) Assignee: Hawley & Hoops, Inc., McLean, VA (US)

( * ) Notice: Subject to any disclaimer, the term of this patent is extended or adjusted under 35 U.S.C. 154(b) by 0 days.

(21) Appl. No.: 09/419,041

(22) Filed: Oct. 15, 1999

(51) Int. Cl.[7] .............................. A23C 13/08; A23D 9/02
(52) U.S. Cl. .................. 426/330.2; 426/607; 426/581; 426/321
(58) Field of Search ..................... 426/601, 581, 426/607, 321, 330.2

(56) References Cited

U.S. PATENT DOCUMENTS 5,149,560 * 9/1992 Kealey .................. 426/602
5,962,062 * 10/1999 Carrie .................. 426/585

FOREIGN PATENT DOCUMENTS

2276629 * 5/1994 (GB) .
WO 98/34494 * 8/1998 (WO) .

OTHER PUBLICATIONS

Simoneau 1996 JAOCS 73 (8) 955–961.*
Williams 1997 JAOCS 74 (4) 357–366.*
Reddy 1996 JAOCS 73(6) 723–727.*
Hartel 1996 JAOCS 73 (8) 945–953.*
Ali 1994 JAOCS 71 (8) 803–806.*

* cited by examiner

*Primary Examiner*—Carolyn Paden
(74) *Attorney, Agent, or Firm*—Fitzpatrick, Cella, Harper & Scinto

(57) ABSTRACT

This invention is directed to a food ingredient of anhydrous milk fat and an effective amount of vegetable fat to enhance the oxidative stability of the anhydrous milk fat.

8 Claims, 1 Drawing Sheet

ANHYDROUS MILK FAT/VEGETABLE FAT FOOD INGREDIENT

BACKGROUND OF THE INVENTION

1. Field of the Invention

This invention relates to a food ingredient comprising anhydrous milk fat and an effective amount of a vegetable fat to enhance the oxidative stability of the anhydrous milk fat. A particularly preferred food ingredient of this invention comprises a mixture of anhydrous milk fat and cocoa butter.

2. Related Background Art

Anhydrous milk fat is a well know ingredient that is often used in the confectionery industry. The oxidative stability of anhydrous milk fat is known to degrade over time. This oxidative degradation may result in deleterious taste attributes in confectionery in which anhydrous milk fat is used.

Vegetable fats, such as cocoa butter, are also well known ingredients that are often employed in confectionery. It would be highly desirable if the oxidative stability of anhydrous milk fat could be improved by the addition of a vegetable fat. Such a food ingredient composition would be particularly desirable where both the anhydrous milk fat and the vegetable fat were to be used in a confectionery food product requiring both components.

SUMMARY OF THE INVENTION

This invention is directed to a food ingredient composition comprising anhydrous milk fat and an effective amount of vegetable fat to enhance the oxidative stability of the anhydrous milk fat. Generally, the anhydrous milk fat may be present in the food ingredient composition in a range of about 1% to about 99% by weight of the food ingredient, but more preferably the anhydrous milk fat is the predominant component of the food ingredient, i.e., greater than 50% by weight of the food ingredient composition. The preferred vegetable fat of this invention is cocoa butter.

DETAILED DESCRIPTION OF THE INVENTION

Figure 1:
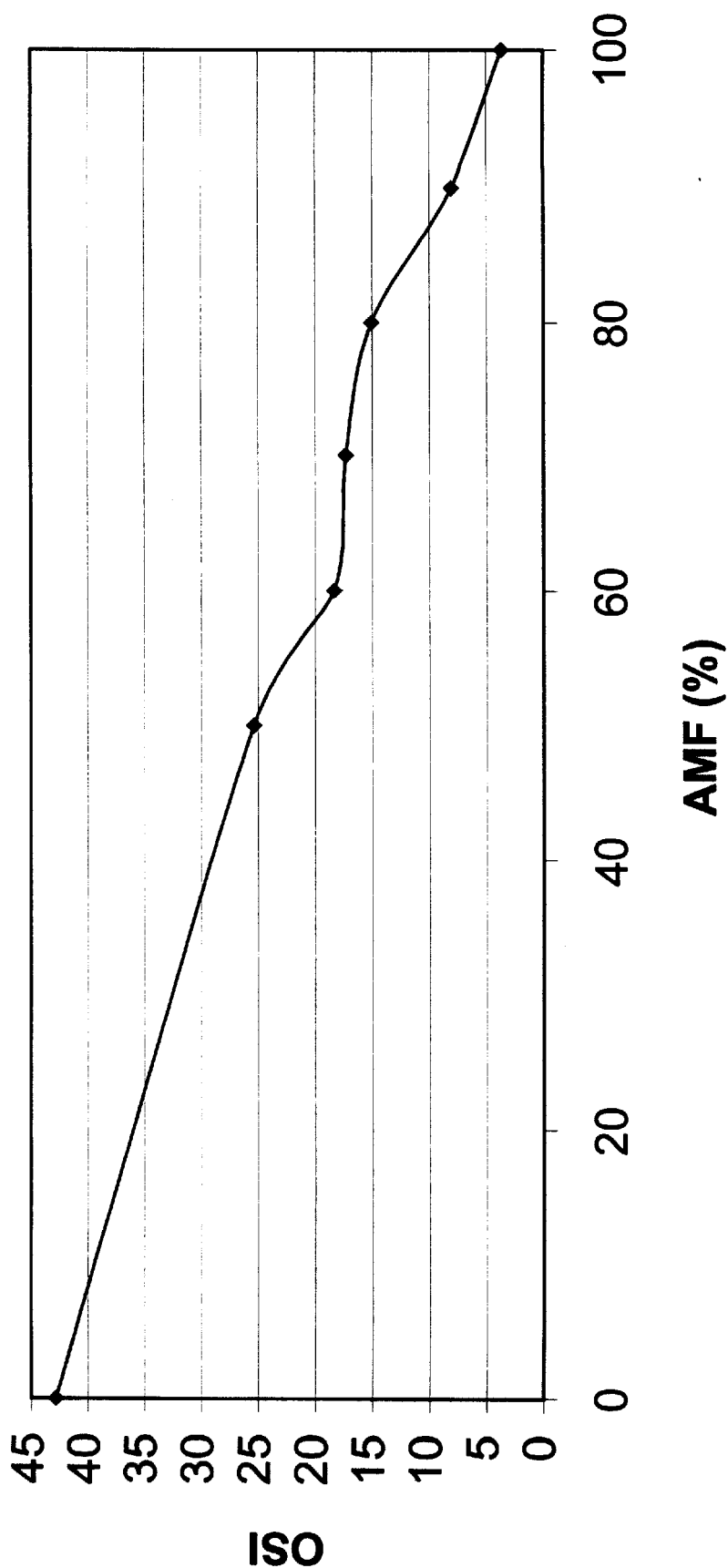
FIG. 1 is a graph depicting the oxidative stability of anhydrous milk fat admixed with various amounts of cocoa butter.

This invention relates to a food ingredient composition comprising anhydrous milk fat and a vegetable fat. The food ingredient composition of this invention provides a convenient source of anhydrous milk fat with improved oxidative stability over 100% anhydrous milk fat. The food ingredient composition of this invention is particularly useful in food compositions requiring anhydrous milk fat and the vegetable fat used to stabilize the anhydrous milk fat.

Anhydrous milk fat is the pure fat phase separated from fresh cow's milk. It is generally produced from fresh pasteurized, uncultured whole milk or cream. The production of anhydrous milk fat is well known to those skilled in the art. Generally, the milk fat of anhydrous milk fat is not less than about 99.8 percent and the moisture level is less than about 0.1 percent. See e.g., 37 C.F.R. 58.347 (1999).

Anhydrous milk fat storage stability is influenced by its storage temperature and exposure to oxygen. If not properly stored there is a risk of oxidative degradation that may lead to deleterious flavor notes. Thus it is important to maintain the oxidative stability of anhydrous milk fat. Generally, this may be accomplished by storing the anhydrous milk fat at low temperatures and/or under inert atmosphere, such as nitrogen, to minimize oxidative degradation. Storage, however, at low temperatures and/or under inert conditions may be costly. In addition, it is often economically favorable to import anhydrous milk fat from distant sources which may potentially expose the anhydrous milk fat to variable storage conditions as well as lengthier storage times. Accordingly, an additional safeguard for maintaining the oxidative stability of anhydrous milk fat would be highly advantageous.

Vegetable fats have been reported to have antioxidative qualities. However, vegetable fats are highly complex food systems and it was unknown if these antioxidative qualities would be effectively transferable to anhydrous milk fat. Surprisingly, it has been discovered that the addition of vegetable fats to anhydrous milk fat does indeed provide a significant increase in the oxidative stability of anhydrous milk fat. This is highly significant since vegetable fats are often used in combination with anhydrous milk fat in various food compositions, e.g. chocolate, caramel and the like. Thus, the food ingredient of this invention, comprising an admixture of anhydrous milk fat and vegetable fat, provides a source of oxidatively stable anhydrous milk fat in combination with another component, i.e., the vegetable fat, which will ultimately be used together in a food composition. Thus oxidative stability of the anhydrous milk fat is improved without the need to separate the vegetable fat prior to use.

The vegetable fats which may be employed in the food ingredient of this invention include, for example, soybean oil, cotton seed oil, peanut oil, corn oil, olive oil, palm oil, palm kernel oil, coconut oil, cocoa butter and mixtures thereof. As used herein, vegetable fats includes all fats and oils which are not animal fats. They may be fractionated or hydrogenated and include confectionery fats referred to and known in the art as Cocoa Butter Substitutes, Cocoa Butter Equivalents and Cocoa Butter Replacers. They may also include structured triacylglycerols that have been chemically or enzymatically derived. They may be refined as well as virgin fats and oils. Cocoa butter is a particularly preferred vegetable fat.

The food ingredient of this invention is prepared by mixing anhydrous milk fat and the vegetable fat. While the anhydrous milk fat may be present in an amount from about 1% to about 99% by weight of the composition, it is preferable that the anhydrous milk fat be the predominant component of the food ingredient. Thus, preferably the food ingredient composition contains anhydrous milk fat in the amount of from about 50% to about 90% by weight of the food ingredient, more preferably from about 80% to about 90% by weight of the food ingredient.

The vegetable fat is present in an amount of at least about 1%, more preferably at about 10% by weight of the food ingredient and generally will be present in the range of about 10% to about 80% by weight of the food ingredient. Most preferably, the vegetable fat is present in an amount of about 10% to about 20% by weight of the food ingredient.

While the food ingredient composition of this invention is comprised primarily of anhydrous milk fat and vegetable fat, the composition may optionally contain minor amounts of adjuvant components, such as for example, antioxidants like ascorbic acid or tocopherol, flavorants, colorants, phospholipids and the like.

Cocoa butter is a relatively costly food component. It has been surprisingly discovered that the most significant enhancement of oxidative stability of anhydrous milk fat per weight of added cocoa butter is achieved when about 10% to about 20% by weight cocoa butter is employed. This advantageous enhancement of oxidative stability of anhydrous milk fat is illustrated in FIG. 1 which shows that the greatest change in oxidative stability was achieved when about 10% to about 20% by weight cocoa butter was employed. This highly preferred range was completely unexpected.

Accordingly, a particular preferred embodiment of this invention is directed to a food ingredient consisting essentially of (i) cocoa butter in an amount of about 10% to about 20% by weight of the food ingredient; and (ii) anhydrous milk fat in an amount of about 80% to about 90% by weight of the food ingredient.

The food ingredient of this invention may be used in various food compositions and particularly in confectionery compositions. Exemplary food compositions in which the food ingredient of this invention may be employed include chocolate (both standard of identity (SOI) and non-SOI chocolate, caramel, ice cream and the like.

Not only does the food ingredient of this invention provide a source of more oxidatively stable anhydrous milk fat, but it also provides a food ingredient that simplifies the process of food preparation by reducing the number of ingredients that need be added while preparing a particular food composition containing anhydrous milk fat and vegetable fat.

Given the discovery herein that vegetable fats may be employed to provide anhydrous milk fat with improved oxidative stability, it is believed that the oxidative stability of anhydrous milk fat may also be enhanced by replacing vegetable fat with other stabilizing components such as chocolate liquor, cocoa solids, nut solids or ground nut meats. Of course, it is also possible to use such other stabilizing components in combination with vegetable fat.

The Examples are intended as an illustration of certain preferred embodiments of the invention and no limitation of the invention is implied.

EXAMPLE 1

A food ingredient composition was prepared by mixing 90% (w/w) anhydrous milk fat and 10% (w/w) cocoa butter.

EXAMPLE 2

A food ingredient composition was prepared by mixing 80% (w/w) anhydrous milk fat and 20% (w/w) cocoa butter.

EXAMPLE 3

A food ingredient composition was prepared by mixing 70% (w/w) anhydrous milk fat and 30% (w/w) cocoa butter.

EXAMPLE 4

A food ingredient composition was prepared by mixing 60% (w/w) anhydrous milk fat and 40% (w/w) cocoa butter.

EXAMPLE 5

A food ingredient composition was prepared by mixing 50% (w/w) anhydrous milk fat and 50% (w/w) cocoa butter.

The food ingredient compositions of Examples 1–5 were tested for oxidative stability along with 100% anhydrous milk fat (AMF) and 100% cocoa butter (CB).

The test was conducted by determining the oxidative stability index (OSI) of each composition at 130° C. using AACS Official Method Cd 12b-92. The results of the test are shown below in Table 1 and illustrated in FIG. 1.

TABLE 1

| Composition | OSI* |
| --- | --- |
| 100% AM | 3.65 |
| 90% AM/10% CB (Ex. 1) | 8.08 |
| 80% AM/20% CB (Ex. 2) | 15.05 |
| 70% AM/30% CB (Ex. 3) | 17.50 |
| 60% AM/40% CB (Ex. 4) | 18.53 |
| 50% AM/50% CB (Ex. 5) | 25.35 |
| 100% CB | 42.83 |

*Average OSI based on two repetitions

What is claimed is:

1. A method of improving the oxidative stability of anhydrous milk fat comprising the step of mixing anhydrous milk fat with an effective amount of a stabilizing component selected from the group consisting of cocoa butter and chocolate liquor to enhance the oxidative stability of said anhydrous milk fat.

2. A method according to claim 1 wherein said stabilizing component is cocoa butter present in an amount of about 1% to about 20% by weight of the mixture of anhydrous milk fat and cocoa butter.

3. A method according to claim 2, wherein said cocoa butter is present in an amount of about 10% to about 20% by weight of the mixture of anhydrous milk fat and cocoa butter.

4. A method according to claim 1, wherein said stabilizing component is chocolate liquor.

5. A food ingredient comprising
   (i) anhydrous milk fat in an amount in a range of about 80% to about 99% by weight of the food ingredient; and
   (ii) a stabilizing component selected from the group consisting of cocoa butter and chocolate liquor in an effective amount to enhance the stability of the anhydrous milk fat.

6. A food ingredient according to claim 5, wherein said stabilizing component is cocoa butter.

7. A food ingredient according to claim 6, wherein said anhydrous milk fat is present in an amount in a range of about 80% to about 90% by weight of the food ingredient.

8. A food ingredient according to claim 5, wherein said stabilizing component is chocolate liquor.

* * * * *

UNITED STATES PATENT AND TRADEMARK OFFICE
CERTIFICATE OF CORRECTION

PATENT NO.      : 6,265,007 B1
DATED           : July 24, 2001
INVENTOR(S)     : Gary G. Youcheff et al.

Page 1 of 1

It is certified that error appears in the above-identified patent and that said Letters Patent is hereby corrected as shown below:

<u>Column 1,</u>
Line 67, "know" should read -- known --; and
Line 27, "Thus" should read -- Thus, --.

<u>Column 2,</u>
Line 27, "Thus" should read -- Thus, --.

<u>Column 4,</u>
Line 31, "claim 1" should read -- claim 1, --; and
Line 41, "comprising" should read -- comprising: --

Signed and Sealed this

Nineteenth Day of March, 2002

*Attest:*

JAMES E. ROGAN
*Director of the United States Patent and Trademark Office*

*Attesting Officer*